United States Patent
Song (10) Patent No.: US 9,823,522 B2
(45) Date of Patent: Nov. 21, 2017

(54) COA TYPE LIQUID CRYSTAL DISPLAY PANEL AND METHOD FOR MANUFACTURING THE SAME

(71) Applicant: Shenzhen China Star Optoelectronics Technology Co., Ltd., Shenzhen (CN)

(72) Inventor: Liwang Song, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 197 days.

(21) Appl. No.: 14/781,579

(22) PCT Filed: Aug. 21, 2015

(86) PCT No.: PCT/CN2015/087721
§ 371 (c)(1),
(2) Date: Sep. 30, 2015

(87) PCT Pub. No.: WO2017/008369
PCT Pub. Date: Jan. 19, 2017

(65) Prior Publication Data
US 2017/0153479 A1    Jun. 1, 2017

(30) Foreign Application Priority Data

Jul. 15, 2015 (CN) .......................... 2015 1 0417134

(51) Int. Cl.
G02F 1/1339   (2006.01)
G02F 1/1333   (2006.01)
(Continued)

(52) U.S. Cl.
CPC ........ *G02F 1/13394* (2013.01); *G02F 1/1368* (2013.01); *G02F 1/133345* (2013.01);
(Continued)

(58) Field of Classification Search
None
See application file for complete search history.

(56) References Cited

U.S. PATENT DOCUMENTS

2006/0097414 A1* 5/2006 Chae ..................... G02B 5/22
                                                            264/1.27
2008/0157414 A1* 7/2008 Kim ................... B29C 33/3857
                                                            264/1.36
(Continued)

FOREIGN PATENT DOCUMENTS

CN          104503150 A      4/2015

*Primary Examiner* — Ryan Crockett
(74) *Attorney, Agent, or Firm* — Leong C. Lei (57) ABSTRACT

A COA type liquid crystal display panel and a method for manufacturing the same are disclosed. The photoresist layer comprises a white, a red, a green, and a blue photoresist. The spacer layer is formed with at least one color of photoresists at the same time, and the material is the same. The photo spacer layer using photoresist as material of the prior art is eliminated. Thus the production requires less time and the efficiency is higher. The method comprises forming a photoresist layer composed of a white, a red, a green, and a blue photoresist on the TFT layer, and forming a spacer layer at the same time when forming the corresponding photoresist using at least one color of photoresist material. The manufacture process for making the photo spacer layer of the prior art is eliminated to save the mask, shorten the production time and increase the production efficiency.

6 Claims, 9 Drawing Sheets (51) Int. Cl.
*G02F 1/1343* (2006.01)
*G02F 1/1362* (2006.01)
*G02F 1/1368* (2006.01)

(52) U.S. Cl.
CPC .. *G02F 1/134309* (2013.01); *G02F 1/136227* (2013.01); *G02F 2001/13396* (2013.01); *G02F 2001/13398* (2013.01); *G02F 2001/136222* (2013.01); *G02F 2201/123* (2013.01); *G02F 2201/52* (2013.01)

(56) References Cited

U.S. PATENT DOCUMENTS

| | | | | |
|---|---|---|---|---|
| 2008/0158487 | A1* | 7/2008 | Kim | C08F 220/00 349/106 |
| 2010/0085515 | A1* | 4/2010 | Kim | G02F 1/13394 349/106 |
| 2013/0119857 | A1* | 5/2013 | Su | H05B 33/10 313/504 |
| 2015/0185551 | A1* | 7/2015 | Kim | G02F 1/133514 349/110 |
| 2016/0170253 | A1* | 6/2016 | Song | G02F 1/1368 257/72 |
| 2016/0187689 | A1* | 6/2016 | Wu | G02F 1/1368 257/72 |
| 2016/0216543 | A1* | 7/2016 | Hong | G02F 1/136227 |
| 2016/0378239 | A1* | 12/2016 | Lee | G09G 3/3648 345/173 |
| 2017/0153519 | A1* | 6/2017 | Xu | G02F 1/136227 |

* cited by examiner

COA TYPE LIQUID CRYSTAL DISPLAY PANEL AND METHOD FOR MANUFACTURING THE SAME

BACKGROUND

Technical Field

The disclosure is related to the display technology field, and more particular to a COA type liquid crystal display panel and method for manufacturing the same.

Related Art

With the development of display technology, liquid crystal display (LCD) and other flat panel display devices are widely used in mobile phones, televisions, personal digital assistants, digital cameras, notebook computers, desktop computers and other consumer electronic products because of its high-definition, wide power, thin body and broad applications, and etc., which, has become the mainstream among the display devices.

Most of the existing LCD monitors on the market are backlight type LCD display comprising a liquid crystal display panel and a backlight module. Generally the liquid crystal display panel is composed of a color filter (CF) substrate, a thin film transistor (TFT) array substrate, and a liquid crystal layer between the two substrates. The operation principle is that the rotation of the liquid crystal molecules is controlled by applying a driving voltage to the two substrate to reflect the light from the backlight module to generate an image.

In order to improve the aperture ratio of the liquid crystal display panel and reduce the parasitic capacitance effects, during the manufacturing process of the liquid crystal display panel, the color films are integrated in one side of the TFT array substrate, which is so-called COA (Color Filter On Array) technology.

The conventional liquid crystal display panel pixel generally comprises red (R) sub-pixel, green (G) sub-pixel, and blue (B) sub-pixel. The corresponding color film layer comprises red, green, and blue photoresist. However, the transmittance and the light mixing efficiency are relatively low and the power consumption is larger. In order to improve the brightness of the LCD panel and reduce energy consumption, a white sub-pixel W is added on the basis of red sub-pixel, green sub-pixel, and blue sub-pixel. The corresponding color film layer is added with a white photoresist.

Combining the RGBW technology with the COA technology, the TFT array substrate having the RGBW photoresists formed on one side thereof is smoother. The photo spacer (PS) may be formed on one side of the TFT array substrate to reduce the light leakage and the probability of occurrence of uneven brightness. In the meanwhile, the requirement for the alignment between the upper substrate and the lower substrate is reduced.

However, the photo spacer formed on one side of the TFT array substrate requires an additional photoetching process individually such that the production time for the TFT array substrate is longer and the production efficiency is lower.

Figure 1:
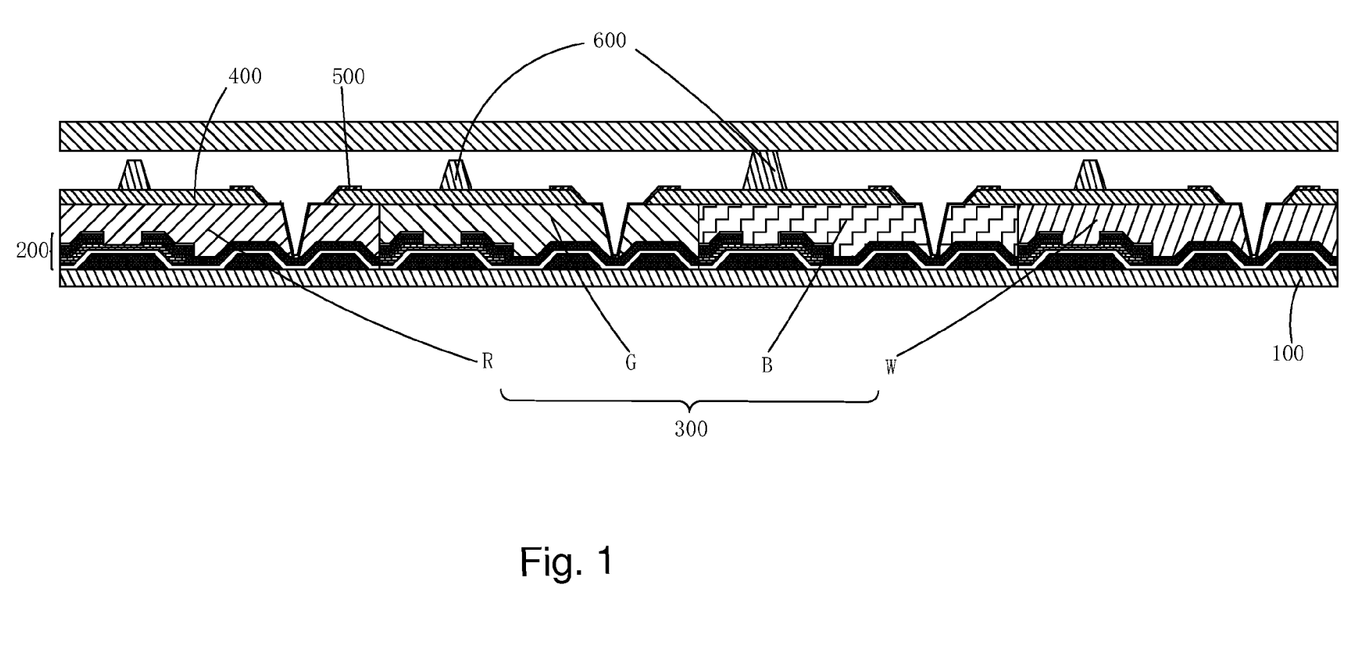
FIG. 1 is the schematic sectional view of the COA type liquid crystal display panel of the prior art.

Refer to FIG. 1, which is the schematic sectional view of the COA type liquid crystal display panel of the prior art. The manufacturing process of the TFT array substrate comprises the steps of sequentially forming a TFT layer 200, a photoresist layer 200 (including red photoresist R, green photoresist G, blue photoresist B, and white photoresist W), a protection layer 400, the pixel electrode layer 500 and the photo spacer layer 600 on the lower substrate 100. The photo spacer layer 600 comprises a higher primary photo spacer and a lower photo spacer. The manufacturing process requires more time due to an additional photoetching process for the photo spacer layer 600, and thus the production efficiency is lower.

SUMMARY

The object of the disclosure is to provide a COA type liquid crystal display panel requiring less production time and having higher production efficiency.

Another object of the disclosure is to provide a method for manufacturing a type liquid crystal display panel, which may save masks, shorten the production time and increase production efficiency.

In order to achieve the above object, the disclosure provides a COA type liquid crystal display panel comprises a first substrate, a TFT layer on the first substrate, a photoresist layer on the TFT layer, a spacer layer on the photoresist layer, a protection layer on the photoresist layer and the spacer layer, a through hole penetrating the protection layer and the photoresist layer, a pixel electrode layer on the protection layer, the pixel electrode layer electrically connected to the TFT layer through the through hole; and a second substrate arranged opposite to the first substrate;

wherein the photoresist layer comprises a white photoresist, a red photoresist, a green photoresist, and a blue photoresist;

wherein the spacer layer and at least one color of the photoresists are formed simultaneously, and the material of the spacer layer and at least one color of the photoresists are the same.

Alternatively, the white photoresist, the red photoresist, the green photoresist, and the blue photoresist are arranged in an array; the spacer layer and the white photoresist are formed simultaneously, and the material of the spacer layer and the white photoresist are the same;

wherein the thickness of the blue photoresist is greater than the thickness of the red and the green photoresist; the thickness of the red and the green photoresist is the same;

wherein the spacer layer comprises a primary spacer and a secondary spacer, the primary spacer is on the blue photoresist, and the secondary spacer is on at least one of the red photoresist and the green photoresist.

Alternatively, the white photoresist is in a frame shape having a plurality of hollow receiving portions; the red photoresist, the green photoresist, and the blue photoresist are in an island shape, and are respectively arranged in the receiving portions; the spacer layer is on the white photoresist;

wherein the thickness of the blue photoresist is greater than the thickness of the red and the green photoresist; the thickness of the red and the green photoresist is the same;

wherein the spacer layer comprises a primary spacer and a secondary spacer; the primary spacer and the blue photoresist are formed simultaneously, and the material of the primary spacer and the blue photoresist are the same; the secondary spacer and the red photoresist or the green photoresist are formed simultaneously, and the material of the secondary spacer and the red photoresist or the green photoresist are the same.

Alternatively, the white photoresist is in a frame shape having a plurality of hollow receiving portions; the red photoresist, the green photoresist, and the blue photoresist are in an island shape, and are respectively arranged in the receiving portions; the spacer layer is on the white photoresist;

wherein the spacer layer comprises a primary spacer and a secondary spacer; the primary spacer and the secondary spacer are formed simultaneously with one of the other photoresists except the white photoresist, and the material of the primary spacer, the secondary spacer, and the one of the other photoresists except the white photoresist are the same; the height of the primary spacer is higher than the height of the secondary spacer.

The disclosure further provides a COA type liquid crystal display panel comprises forming a photoresist layer composed of a white photoresist, a red photoresist, a green photoresist, and a blue photoresist on a TFT layer, and form a spacer layer at the same time when using at least one color of the photoresists to make a corresponding photoresist.

Alternatively, the method for manufacturing a COA type liquid crystal display panel comprises the following steps:

Step 1: providing a first substrate and forming a TFT layer on the first substrate;

Step 2: forming a red photoresist, a green photoresist, and a blue photoresist respectively through coating and photo mask on the TFT layer;

wherein the thickness of the blue photoresist is greater than the thickness of the red and the green photoresist; the thickness of the red and the green photoresist is the same;

Step 3: coating the white photoresist material on the TFT layer, the red photoresist, the green photoresist and the blue photoresist; using a mask to photoetch the white photoresist material and simultaneously forming a primary spacer on the blue photoresist, a secondary spacer on at least one of the red photoresist and the green photoresist, and the white photoresist on the TFT layer;

wherein the white photoresist, the red photoresist, the green photoresist, and the blue photoresist are arranged in an array to form a photoresist layer; wherein the primary spacer and the secondary spacer form a spacer layer;

Step 4: covering an inorganic material or organic transparent material on the photoresist layer and the spacer layer to form a protection layer, and forming a through hole penetrating the protection layer and the photoresist layer by dry etching or wet etching;

Step 5: evaporating ITO film on the protection layer and forming a pixel electrode layer through wet etching, wherein the pixel electrode layer is electrically connected to the TFT layer through the through hole;

Step 6: providing a second substrate, injecting liquid crystal molecules between the first substrate and the second substrate, and packaging the first substrate and the second substrate.

Alternatively, the method for manufacturing a COA type liquid crystal display panel comprises the following steps:

Step 1: providing a first substrate and forming a TFT layer on the first substrate;

Step 2: coating a white photoresist material on the TFT layer and photoetching the white photoresist material to form a white photoresist in a frame-shape having a plurality of hollow receiving portions;

Step 3: forming a red photoresist, a green photoresist, and a blue photoresist in an island shape in the receiving portions on the white photoresist through coating and photoetching; forming a primary spacer on the white photoresist at the same time when forming the blue photoresist through a mask, wherein the material of the primary spacer is the same as that of the blue photoresist; forming a secondary spacer on the white photoresist at the same time when forming the red photoresist or the green photoresist through a mask, wherein the material of the secondary spacer is the same as that of the red photoresist or the green photoresist;

wherein the thickness of the blue photoresist is greater than the thickness of the red and the green photoresist; the thickness of the red and the green photoresist is the same; wherein the white photoresist, the red photoresist, the green photoresist, and the blue photoresist are arranged in an array to form a photoresist layer; wherein the primary spacer and the secondary spacer form a spacer layer;

Step 4: covering an inorganic material or organic transparent material on the photoresist layer and the spacer layer to form a protection layer, and forming a through hole penetrating the protection layer and the photoresist layer by dry etching or wet etching;

Step 5: evaporating ITO film on the protection layer and forming a pixel electrode layer through wet etching, wherein the pixel electrode layer is electrically connected to the TFT layer through the through hole;

Step 6: providing a second substrate, injecting liquid crystal molecules between the first substrate and the second substrate, and packaging the first substrate and the second substrate.

Alternatively, the method for manufacturing a COA type liquid crystal display panel comprises the following steps:

Step 1: providing a first substrate and forming a TFT layer on the first substrate;

Step 2: coating a white photoresist material on the TFT layer and photoetching the white photoresist material to form a white photoresist in a frame-shape and a plurality of hollow receiving portions;

Step 3: forming a red photoresist, a green photoresist, and a blue photoresist in an island shape in the receiving portions on the white photoresist through coating and photoetching; forming a primary spacer and a secondary spacer on the white photoresist at the same time when forming the red photoresist, the green photoresist, or the blue photoresist through a gray tone mask; the material of the primary spacer and the secondary spacer is correspondingly the same as that of the red photoresist, the green photoresist, or the blue photoresist; wherein the height of the primary spacer is greater than the height of the secondary spacer;

wherein the white photoresist, the red photoresist, the green photoresist, and the blue photoresist are arranged in an array to form a photoresist layer; wherein the primary spacer and the secondary spacer form a spacer layer;

Step 4: covering an inorganic material or organic transparent material on the photoresist layer and the spacer layer to form a protection layer, and forming a through hole penetrating the protection layer and the photoresist layer by dry etching or wet etching;

Step 5: evaporating ITO film on the protection layer and forming a pixel electrode layer through wet etching, wherein the pixel electrode layer is electrically connected to the TFT layer through the through hole;

Step 6: providing a second substrate, injecting liquid crystal molecules between the first substrate and the second substrate, and packaging the first substrate and the second substrate.

The beneficial effects of the disclosure are as follows. In the COA type liquid crystal display panel of the disclosure, the photoresist layer comprises a white, a red, a green, and a blue photoresist. The spacer layer is formed with at least one color of photoresists at the same time, and the material is the same. The photo spacer layer using photoresist as material of the prior art is eliminated. Thus the production requires less time and the efficiency is higher. The method comprises forming a photoresist layer composed of a white, a red, a green, and a blue photoresist on the TFT layer, and forming a spacer layer at the same time when forming the corresponding photoresist using at least one color of photoresist material. The manufacture process for making the photo spacer layer of the prior art is eliminated to save the mask, shorten the production time and increase the production efficiency.

In order to further understand the characteristics and technical contents of the disclosure, please refer to the following detailed description of the disclosure and the accompanying drawings. The drawings are only for reference and description, and are not intended to limit the disclosure.

BRIEF DESCRIPTION OF THE DRAWINGS

The above and other exemplary aspects, features and advantages of certain exemplary embodiments of the present disclosure will be more apparent from the following description taken in conjunction with the accompanying drawings, in which.

DETAILED DESCRIPTION

The following description with reference to the accompanying drawings is provided to explain the exemplary embodiments of the disclosure. It will be apparent, however, that the disclosure may be practiced by one or more embodiments, and the specific embodiments provided herein cannot be interpreted to limit the disclosure. On the contrary, those embodiments are provided to explain the principle and the application of the disclosure such that those skilled in the art may understand the various embodiments of the disclosure and the various modifications for specific expected application.

Figure 2:
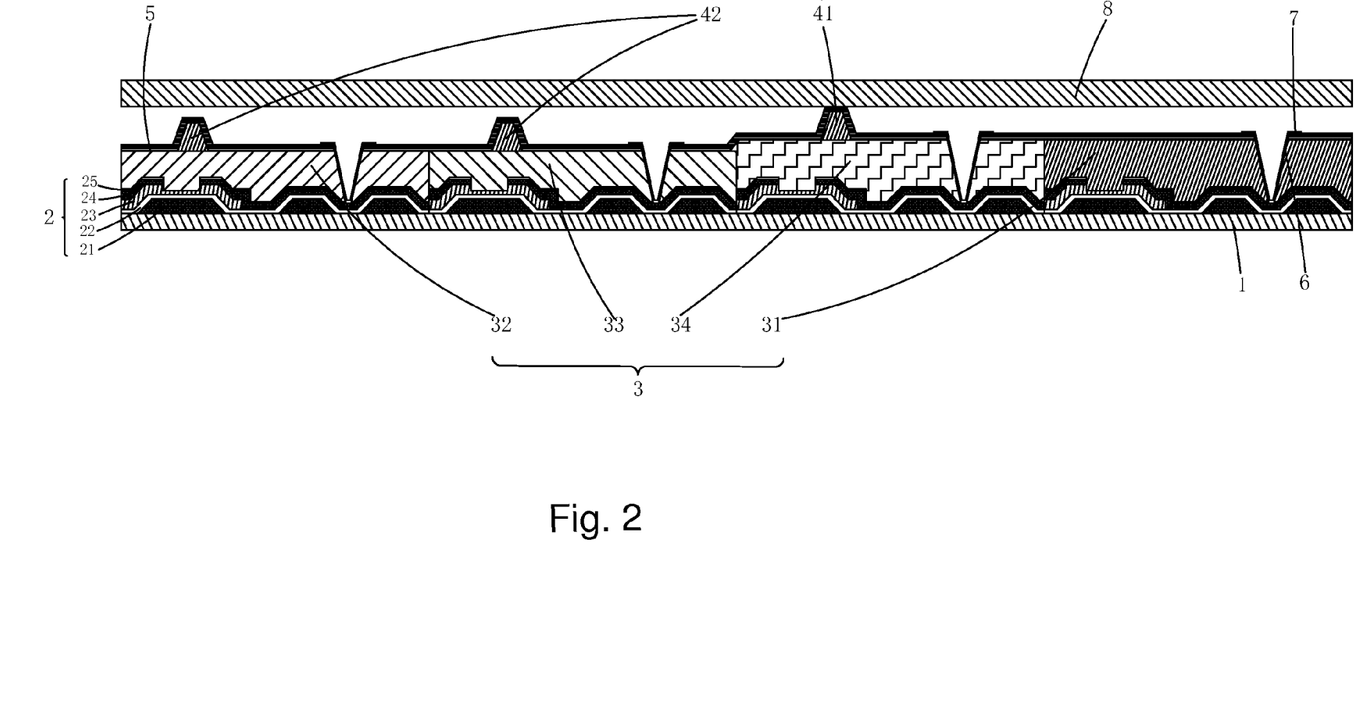
FIG. 2 is the schematic sectional view of the COA type liquid crystal display panel of the first embodiment of the disclosure.

The disclosure provides a COA type liquid crystal display panel. FIG. 2 shows the COA type liquid crystal display panel of the first embodiment of the disclosure. The panel comprises a first substrate 1, a TFT layer 2 on the first substrate 1, a photoresist layer 3 on the TFT layer 2, a spacer layer 4 on the photoresist layer 3, a protection layer 5 on the photoresist layer 3 and the spacer layer 4, a through hole 6 penetrating the protection layer 5 and the photoresist layer 3, a pixel electrode layer 7 on the protection layer 5, the pixel electrode layer electrically connected to the TFT layer 2 through the through hole 6, and a second substrate 8 arranged opposite to the first substrate 1.

Specifically, wherein the photoresist layer 3 comprises a white photoresist 31, a red photoresist 32, a green photoresist 33, and a blue photoresist 34. In the first embodiment, the white photoresist 31, the red photoresist 32, the green photoresist 33, and the blue photoresist 34 are arranged in an array. The spacer layer 4 and the white photoresist 31 are formed at the same time during the manufacturing process, and the material of the spacer layer 4 and the white photoresist 31 are the same.

The thickness of the blue photoresist 34 is greater than the thickness of the red photoresist 32 and the green photoresist 33; the thickness of the red photoresist 32 and the green photoresist 33 is the same. The spacer layer 4 comprises a primary spacer 41 and a secondary spacer 4. The primary spacer 41 is on the blue photoresist 34, and the secondary spacer 42 is on at least one of the red photoresist 32 and the green photoresist 33. That is the secondary spacer 42 may be on the red photoresist 32, or on the green photoresist 33, or on the red photoresist 32 and the green photoresist 33.

FIG. 2 shows that the secondary spacer 42 is on the red photoresist 32 and the green photoresist 33. Because the primary spacer 41 and the secondary spacer 42 and the white photoresist 31 are formed at the same time during the manufacturing process, the height of the primary spacer 41 and the secondary spacer 42 is the same as the thickness of the white photoresist 31. However the thickness of the blue photoresist 34 is greater than the thickness of the red photoresist 32 and the green photoresist 33. Due to the difference between the blue photoresist 34 and the red photoresist 32 and the green photoresist 33, the primary spacer 41 is higher than the secondary spacer.

The TFT layer 2 does not have any difference from the prior art. The TFT layer 2 comprises a first metal layer 21, a gate insulating layer 22, an active layer 23, a second metal layer and an insulating protection layer 25. The first metal layer 21 comprises a gate of the TFT. The active layer 23 is a two-layered structure composed of a-Si layer and an n+Si layer. The second metal layer 24 comprises the source/drain of the TFT. The pixel electrode layer 7 is electrically connected to the source/drain of the TFT.

In the first embodiment of the COA type liquid crystal display panel mentioned above, because the primary spacer 41 and the secondary spacer 42 of the spacer layer 4 and the white photoresist 31 are formed at the same time during the manufacturing process, and the material is the same, the photo spacer layer of the prior art using the photoresist as the material is eliminated to shorten the production time and increase the production efficiency.

Figure 3:
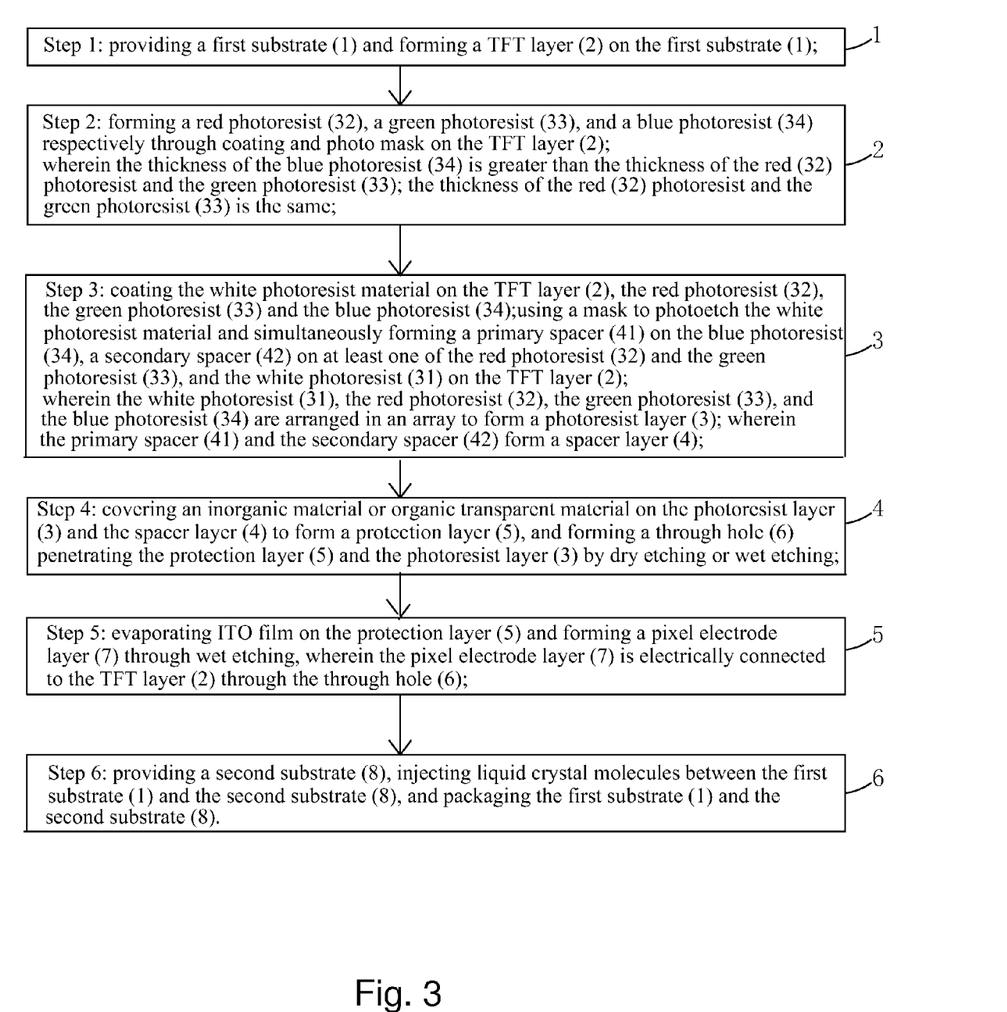
FIG. 3 is the flow chart illustrating the manufacturing process of the COA type liquid crystal display panel of the first embodiment of the disclosure corresponding to FIG. 2.

Refer to FIG. 3 and FIG. 2 simultaneously. FIG. 3 is the flow chart illustrating the manufacturing process of the COA type liquid crystal display panel of the first embodiment of the disclosure, which is the first embodiment for manufacturing the COA type liquid crystal display panel as shown in FIG. 2, comprising the following steps.

Step 1: providing a first substrate 1 and forming a TFT layer 2 on the first substrate 1.

The process of manufacturing TFT layer 2 sequentially comprises forming a first metal layer 21, a gate insulating layer 22, ac active layer 23, a second metal layer 24 and an insulating protection layer 25. The normal manufacture process may be adopted, and is not described here again.

Step 2: forming a red photoresist 32, a green photoresist 33, and a blue photoresist 34 respectively through coating and photo mask on the TFT layer 2.

The thickness of the blue photoresist 34 is greater than the thickness of the red 32 photoresist and the green photoresist 33; the thickness of the red 32 photoresist and the green photoresist 33 is the same.

The sequence for forming the red photoresist 32, the green photoresist 33, and the blue photoresist 34 is not limited in Step 2.

Step 3: coating the white photoresist material on the TFT layer 2, the red photoresist 32, the green photoresist 33 and the blue photoresist 34; using a mask to photoetch the white photoresist material and simultaneously forming a primary spacer 41 on the blue photoresist 34, a secondary spacer 42 on at least one of the red photoresist 32 and the green photoresist 33, and the white photoresist 31 on the TFT layer 2.

The white photoresist 31, the red photoresist 32, the green photoresist 33, and the blue photoresist 34 are arranged in an array to form a photoresist layer 3; wherein the primary spacer 41 and the secondary spacer 42 form a spacer layer 4.

Step 4: covering an inorganic material or organic transparent material on the photoresist layer 3 and the spacer layer 4 to form a protection layer 5, and forming a through hole 6 penetrating the protection layer 5 and the photoresist layer 3 by dry etching or wet etching.

Step 5: evaporating ITO film on the protection layer 5 and forming a pixel electrode layer 7 through wet etching, wherein the pixel electrode layer 7 is electrically connected to the TFT layer 2 through the through hole 6.

Step 6: providing a second substrate 8, injecting liquid crystal molecules between the first substrate 1 and the second substrate 8, and packaging the first substrate 1 and the second substrate 8.

In the first embodiment of the method for manufacturing the COA type liquid crystal display panel as mentioned above, the primary spacer 41 and the secondary spacer 42 are formed simultaneously with the white photoresist 31. The individual process for manufacturing the photo spacer layer in the prior art is eliminated such that the mask is saved, the production time is shortened, and the production efficiency is increased. The height of the primary spacer 41 and the secondary spacer 42 is the same as that of the white photoresist 31. The thickness of the blue photoresist 34 is greater than the thickness of the red photoresist 32 and the green photoresist 33. In view of the height difference among the blue photoresist 34, the red photoresist 32, and the green photoresist 33, the primary spacer 41 is higher than the secondary spacer 42.

Figure 4:
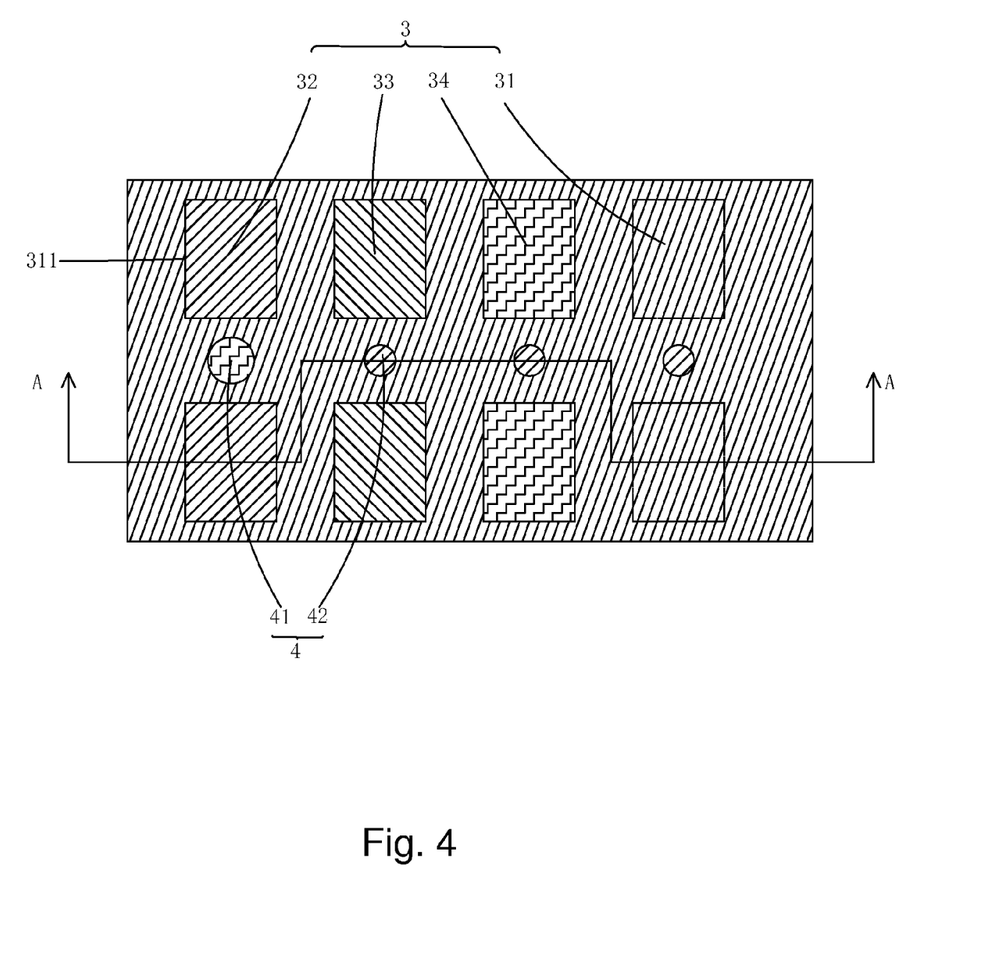
FIG. 4 is the schematic top view of the COA type liquid crystal display panel of the second embodiment of the disclosure.
Figure 5:
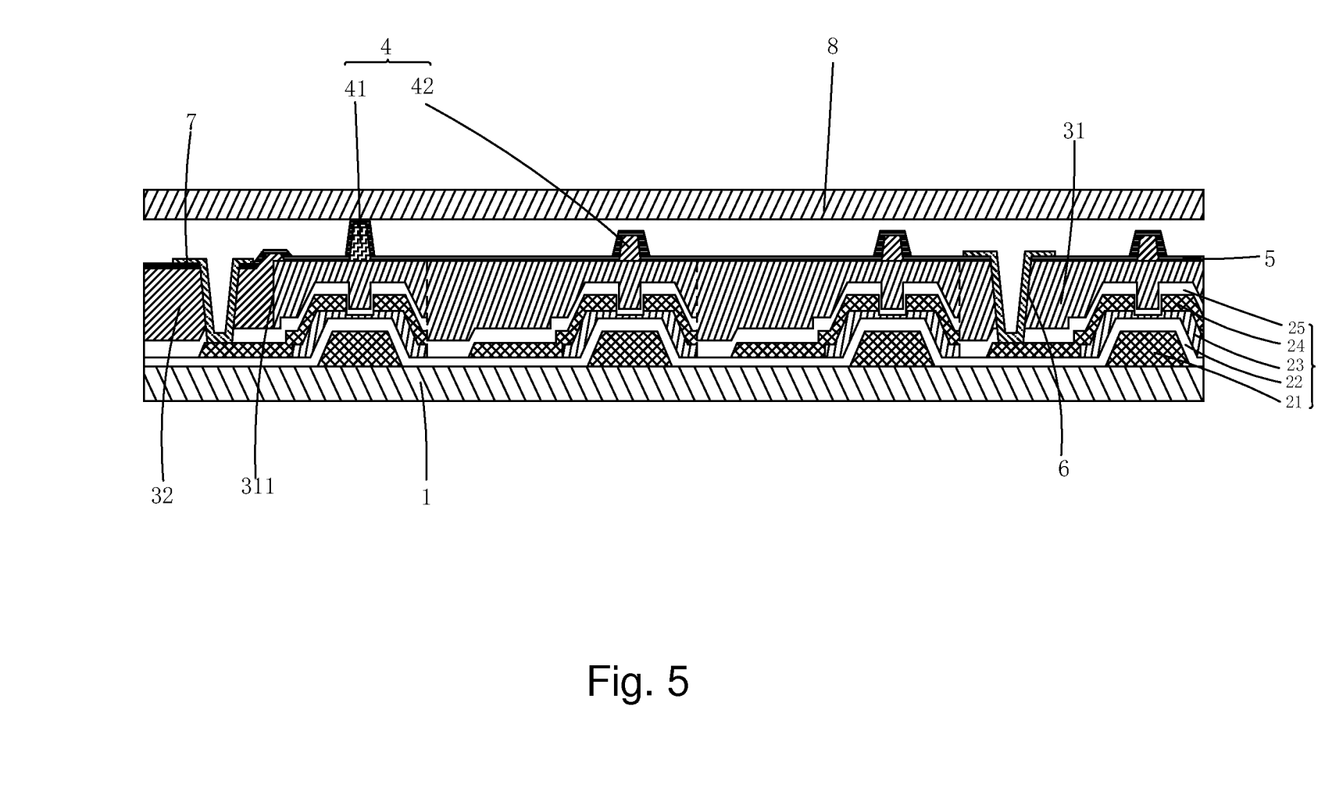
FIG. 5 is the schematic sectional view at A-A portion corresponding to FIG. 4.

Refer to FIG. 4 and FIG. 5 simultaneously, showing the second embodiment of the COA type liquid crystal display panel of the disclosure. The difference between the second embodiment and the first embodiment lies in that the white photoresist 31 is in a frame shape having a plurality of hollow receiving portions 311. The red photoresist 32, and the green photoresist 33, and the blue photoresist 34 are in an island shape and are respectively arranged in the receiving portions 311. The spacer layer 4 is on the white photoresist 31. The primary spacer 41 is formed at the same time with the blue photoresist 34 during the manufacturing process, and the material is the same. The secondary spacer 42 is formed at the same time with the red photoresist 32 or the green photoresist 33, and the material is the same. The remaining is the same as that in the first embodiment and is not described again. In this embodiment, the photo spacer layer in the prior art using the photoresist as the material is eliminated such that the production time is shorter, and the production efficiency is higher.

Because the primary spacer 41 is formed at the same time with the blue photoresist 34 during the manufacturing process, the height of the primary spacer 41 is the same as the thickness of the blue photoresist 34. The second spacer 42 is formed with the red photoresist 32 or the green photoresist 33 during the manufacturing process, the height of the second spacer 42 is the same as the height of the red photoresist 32 or the green photoresist 33. And because the primary spacer 41 and the secondary spacer 42 are on the white photoresist 31, the thickness of the blue photoresist 34 is greater than the thickness of the red photoresist 32 and the green photoresist 33. In view of the thickness difference between the blue photoresist 34 and the red photoresist 32, and the green photoresist 33, the primary spacer 41 is higher than the secondary spacer 42.

Figure 6:
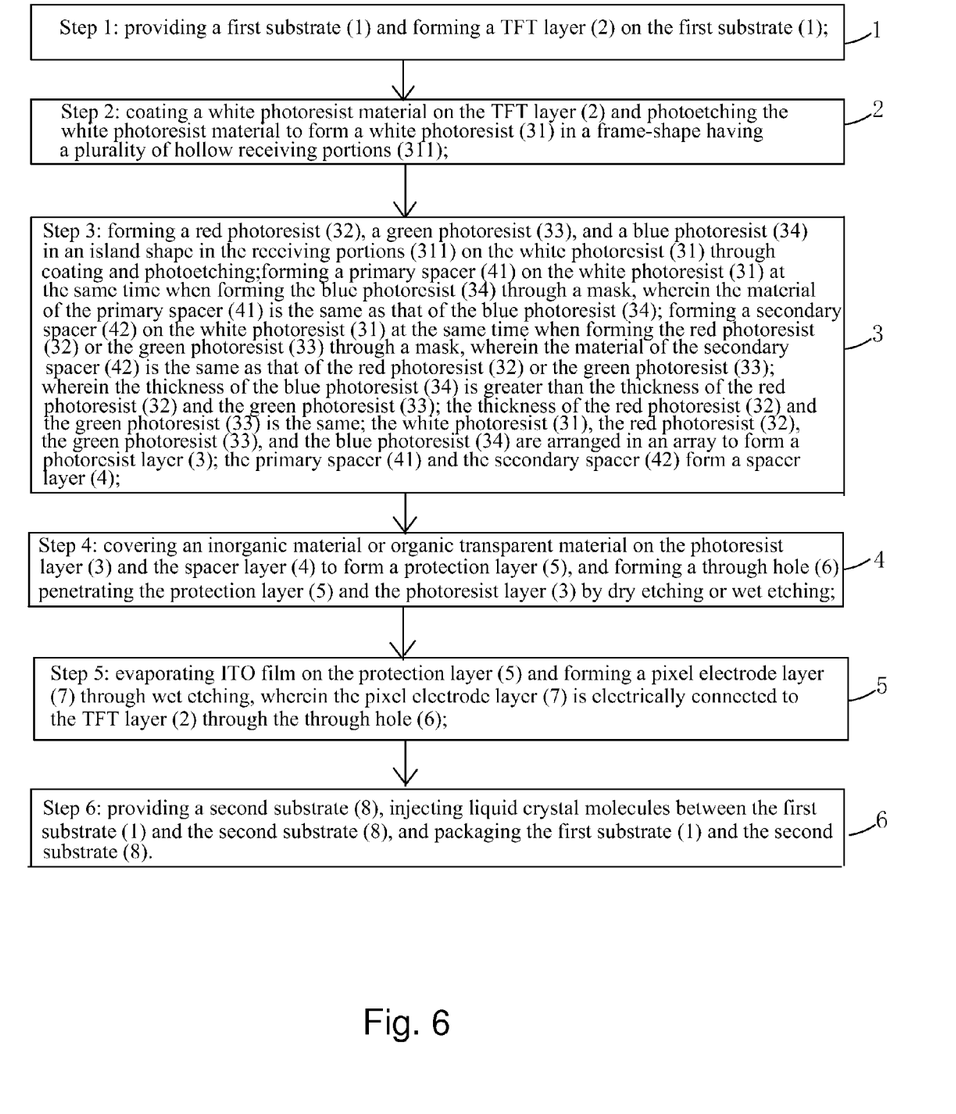
FIG. 6 is the flow chart illustrating the manufacturing process of the COA type liquid crystal display panel of the second embodiment of the disclosure corresponding to FIGS. 4 and 5.

Refer to FIG. 6 in combination with FIG. 4 and FIG. 5. FIG. 6 is the flow chart illustrating the manufacturing process of the COA type liquid crystal display panel of the second embodiment of the disclosure, which is the second embodiment for manufacturing the COA type liquid crystal display panel as shown in FIG. 4 and FIG. 5, comprising the following steps.

Step 1: providing a first substrate 1 and forming a TFT layer 2 on the first substrate 1.

Step 2: coating a white photoresist material on the TFT layer 2 and photoetching the white photoresist material to form a white photoresist 31 in a frame-shape having a plurality of hollow receiving portions 311.

Step 3: forming a red photoresist 32, a green photoresist 33, and a blue photoresist 34 in an island shape in the receiving portions 311 on the white photoresist 31 through coating and photoetching; forming a primary spacer 41 on the white photoresist 31 at the same time when forming the blue photoresist 34 through a mask, wherein the material of the primary spacer 41 is the same as that of the blue photoresist 34; forming a secondary spacer 42 on the white photoresist 31 at the same time when forming the red photoresist 32 or the green photoresist 33 through a mask, wherein the material of the secondary spacer 42 is the same as that of the red photoresist 32 or the green photoresist 33.

The thickness of the blue photoresist 34 is greater than the thickness of the red photoresist 32 and the green photoresist 33; the thickness of the red photoresist 32 and the green photoresist 33 is the same. The white photoresist 31, the red photoresist 32, the green photoresist 33, and the blue photoresist 34 are arranged in an array to form a photoresist layer 3. The primary spacer 41 and the secondary spacer 42 form a spacer layer 4.

The sequence for forming the red photoresist 32, the green photoresist 33, and the blue photoresist 34 is not limited in Step 3.

Step 4: covering an inorganic material or organic transparent material on the photoresist layer 3 and the spacer layer 4 to form a protection layer 5, and forming a through hole 6 penetrating the protection layer 5 and the photoresist layer 3 by dry etching or wet etching.

Step 5: evaporating ITO film on the protection layer 5 and forming a pixel electrode layer 7 through wet etching, wherein the pixel electrode layer 7 is electrically connected to the TFT layer 2 through the through hole 6.

Step 6: providing a second substrate 8, injecting liquid crystal molecules between the first substrate 1 and the second substrate 8, and packaging the first substrate 1 and the second substrate 8.

In the second embodiment of the method for manufacturing the COA type liquid crystal display panel as mentioned above, the primary spacer 41 of the spacer layer 4 is formed simultaneously with the blue photoresist 34, and the secondary spacer 42 is formed simultaneously with the red photoresist 32 or the green photoresist 33. Therefore, individual process for manufacturing the photo spacer layer in the prior art is eliminated such that the mask is saved, the production time is shortened, and the production efficiency is increased. The height of the primary spacer 41 is the same as the thickness of the blue photoresist 34. The height of the secondary spacer 42 is the same as the thickness of the red photoresist 32 or the green photoresist 33. The primary spacer 41 and the secondary spacer 42 are on the white photoresist 31. The thickness of the blue photoresist 34 is greater than that of the red photoresist 32 and the green photoresist 33. In view of the difference between the blue photoresist 34 and the red photoresist 32, and the green photoresist 33, the primary spacer 41 is higher than the secondary spacer 42.

Figure 7:
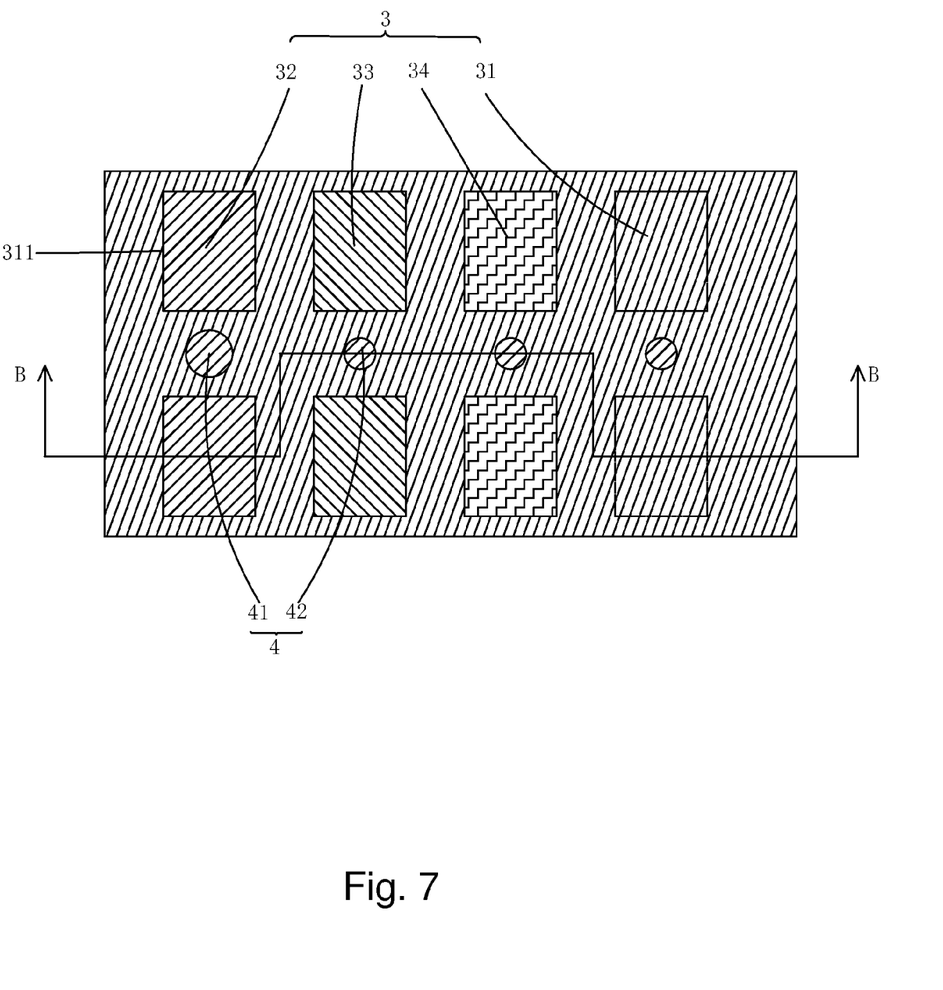
FIG. 7 is the schematic top view of the COA type liquid crystal display panel of the third embodiment of the disclosure.
Figure 8:
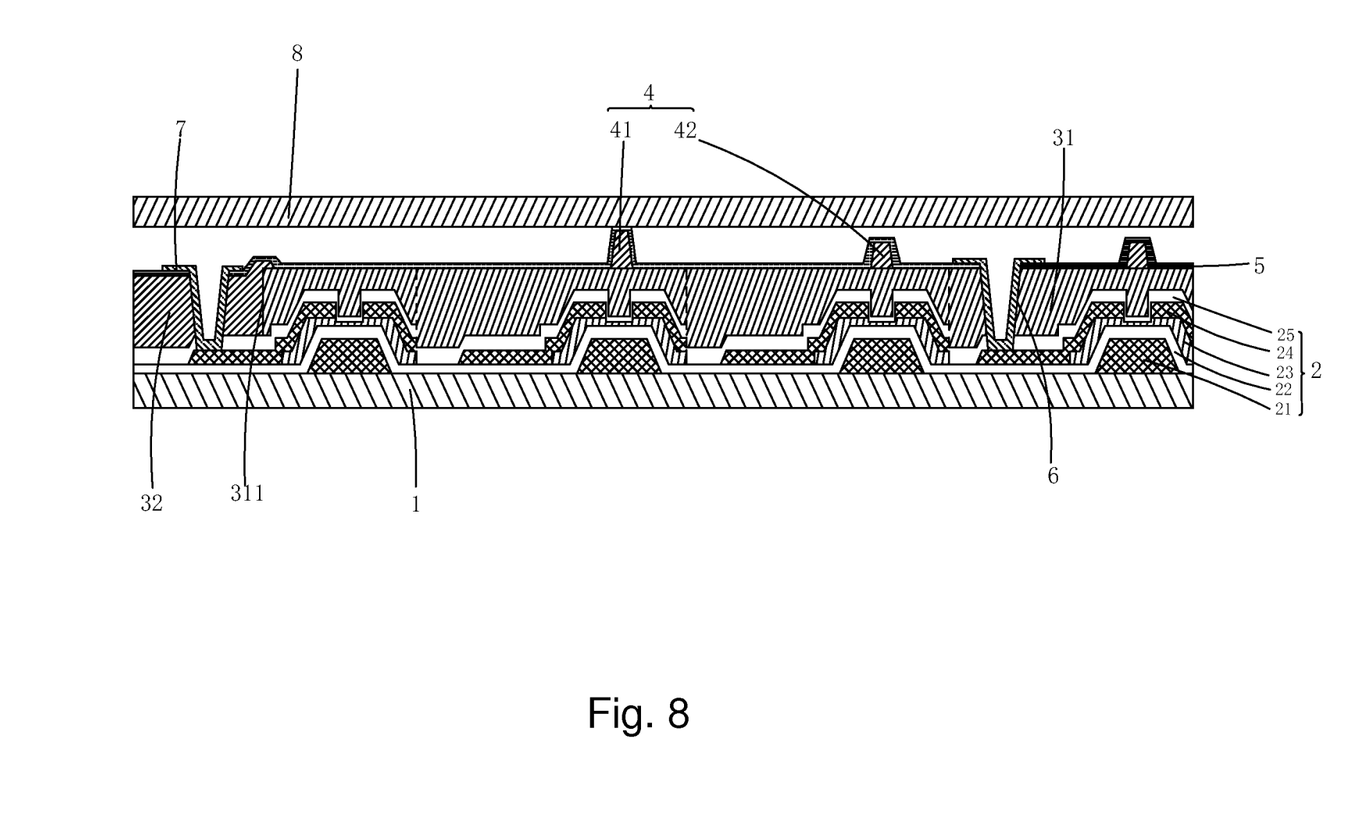
FIG. 8 is the schematic sectional view at B-B portion corresponding to FIG. 7.

Refer to FIG. 7 and FIG. 8, which are the third embodiment of the COA type liquid crystal display panel of the disclosure. The difference between the third embodiment and the first embodiment lies in that the white photoresist 31 is in a frame shape having a plurality of hollow receiving portions 311. The red photoresist 32, and the green photoresist 33, and the blue photoresist 34 are in an island shape and are respectively arranged in the receiving portions 311. The spacer layer 4 is on the white photoresist 31. The primary spacer 41 and the secondary spacer 42 are formed at the same time with one of the other photoresist except the white photoresist 31 during the manufacturing process, and the material is the same. The height of the primary spacer 41 is greater than that of the secondary spacer 42. The remaining is the same as that in the first embodiment and is not described again. In this embodiment, the photo spacer layer in the prior art using the photoresist as the material is eliminated such that the production time is shorter, and the production efficiency is higher.

Figure 9:
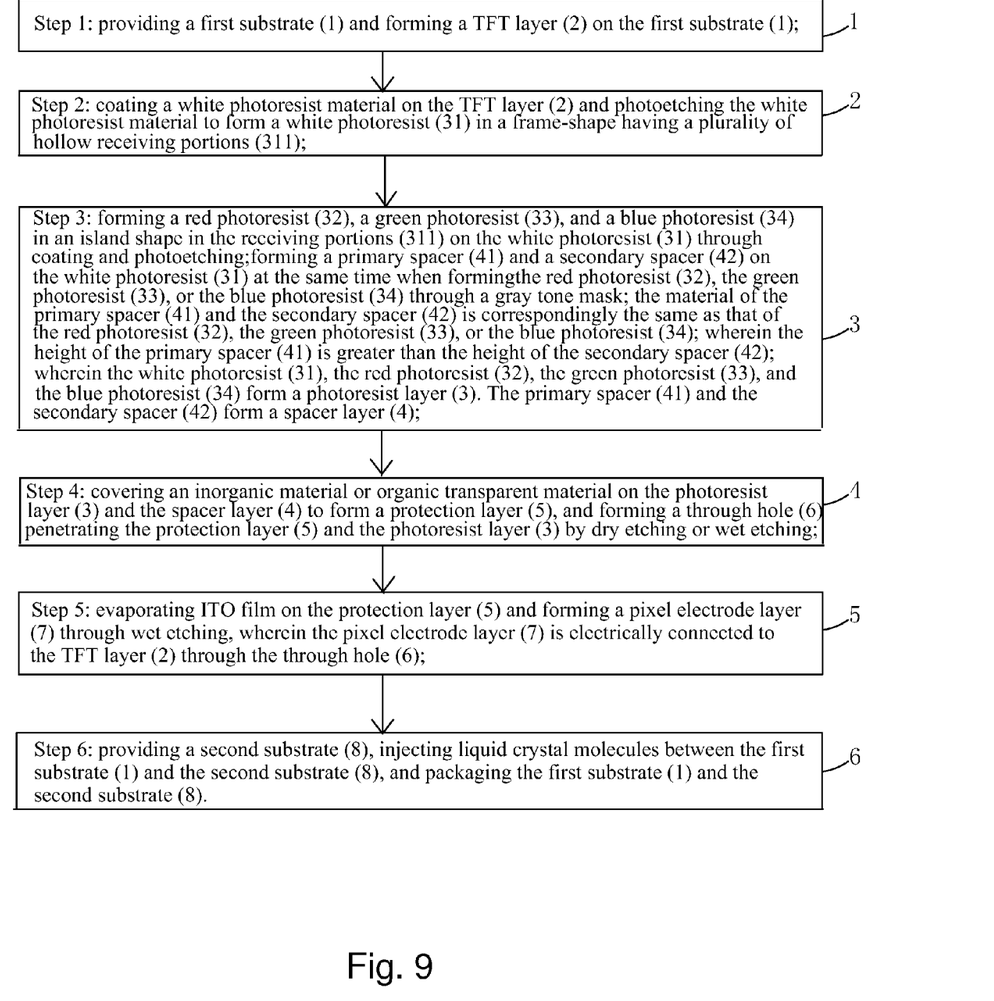
FIG. 9 is the flow chart illustrating the manufacturing process of the COA type liquid crystal display panel of the third embodiment of the disclosure corresponding to FIGS. 7 and 8.

Refer to FIG. 9 in combination with FIG. 7 and FIG. 8. FIG. 9 is the flow chart illustrating the manufacturing process of the COA type liquid crystal display panel of the third embodiment of the disclosure, which is the third embodiment for manufacturing the COA type liquid crystal display panel as shown in FIG. 7 and FIG. 8, comprising the following steps.

Step 1: providing a first substrate 1 and forming a TFT layer 2 on the first substrate 1.

Step 2: coating a white photoresist material on the TFT layer 2 and photoetching the white photoresist material to form a white photoresist 31 in a frame-shape having a plurality of hollow receiving portions 311.

Step 3: forming a red photoresist 32, a green photoresist 33, and a blue photoresist 34 in an island shape in the receiving portions 311 on the white photoresist 31 through coating and photoetching; forming a primary spacer 41 and a secondary spacer 42 on the white photoresist 31 at the same time when forming the red photoresist 32, the green photoresist 33, or the blue photoresist 34 through a gray tone mask; the material of the primary spacer 41 and the secondary spacer 42 is correspondingly the same as that of the red photoresist 32, the green photoresist 33, or the blue photoresist 34; wherein the height of the primary spacer 41 is greater than the height of the secondary spacer 42.

The white photoresist 31, the red photoresist 32, the green photoresist 33, and the blue photoresist 34 form a photoresist layer 3. The primary spacer 41 and the secondary spacer 42 form a spacer layer 4.

The sequence for forming the red photoresist 32, the green photoresist 33, and the blue photoresist 34 is not limited in Step 3. Taking the step of forming the primary spacer 41 and the secondary spacer 42 on the white photoresist 31 at the same time when forming the red photoresist 32 as example, the material of the primary spacer 41 and the secondary spacer 42 and the material of the red photoresist 32 are the same. The photoetching process is performed by using the gray tone mask such that the height of the primary spacer 41 is higher than the secondary spacer 42.

Step 4: covering an inorganic material or organic transparent material on the photoresist layer 3 and the spacer layer 4 to form a protection layer 5, and forming a through hole 6 penetrating the protection layer 5 and the photoresist layer 3 by dry etching or wet etching.

Step 5: evaporating ITO film on the protection layer 5 and forming a pixel electrode layer 7 through wet etching, wherein the pixel electrode layer 7 is electrically connected to the TFT layer 2 through the through hole 6.

Step 6: providing a second substrate 8, injecting liquid crystal molecules between the first substrate 1 and the second substrate 8, and packaging the first substrate 1 and the second substrate 8.

In the third embodiment of the method for manufacturing the COA type liquid crystal display panel as mentioned above, the primary spacer 41 and the secondary spacer 42 on the white photoresist 31 are formed simultaneously with the red photoresist 32 or the green photoresist 33 or the blue photoresist 34 through one gray tone mask. Therefore, individual process for manufacturing the photo spacer layer in the prior art is eliminated such that the mask is saved, the production time is shortened, and the production efficiency is increased. Further, the photoetching process is performed through the gray tone mask such that the height of the primary spacer 41 is greater than that of the secondary spacer 42. Thus the primary spacer 41 is higher than the secondary spacer 42. Using the gray tone mask for photoetching to form the primary spacer 41 and the secondary spacer 42 may eliminate the variability of the film thickness process such that it is easier to control the height of the primary spacer 41 and the secondary spacer 42.

In summary, in the COA type liquid crystal display panel of the disclosure, the photoresist layer comprises a white, a red, a green, and a blue photoresist. The spacer layer is formed with at least one color of photoresists at the same time, and the material is the same. The photo spacer layer using photoresist as material of the prior art is eliminated. Thus the production requires less time and the efficiency is higher. The method comprises forming a photoresist layer composed of a white, a red, a green, and a blue photoresist on the TFT layer, and forming a spacer layer at the same time when forming the corresponding photoresist using at least one color of photoresist material. The manufacture process for making the photo spacer layer of the prior art is eliminated to save the mask, shorten the production time and increase the production efficiency.

Although the present disclosure is illustrated and described with reference to specific embodiments, those skilled in the art will understand that many variations and modifications are readily attainable without departing from the spirit and scope thereof as defined by the appended claims and their legal equivalents.

What is claimed is:

1. A COA type liquid crystal display panel, comprising: a first substrate, a TFT layer on the first substrate, a photoresist layer on the TFT layer, a spacer layer on the photoresist layer, a protection layer on the photoresist layer and the spacer layer, a through hole penetrating the protection layer and the photoresist layer, a pixel electrode layer on the protection layer, the pixel electrode layer electrically connected to the TFT layer through the through hole, and a second substrate arranged opposite to the first substrate; wherein the photoresist layer comprises a white photoresist, a red photoresist, a green photoresist, and a blue photoresist; wherein the spacer layer and at least one color of the photoresists are formed simultaneously, and the material of the spacer layer and at least one color of the photoresists are the same; wherein the white photoresist is in a frame shape having a plurality of hollow receiving portions; the red photoresist, the green photoresist, and the blue photoresist are in an island shape, and are respectively arranged in the receiving portions; the spacer layer is on the white photoresist.

2. The COA type liquid crystal display panel according to claim 1, wherein the thickness of the blue photoresist is greater than the thickness of the red and the green photoresist; the thickness of the red and the green photoresist is the same; wherein the spacer layer comprises a primary spacer and a secondary spacer; the primary spacer and the blue photoresist are formed simultaneously, and the material of the primary spacer and the blue photoresist are the same; the secondary spacer and the red photoresist or the green photoresist are formed simultaneously, and the material of the secondary spacer and the red photoresist or the green photoresist are the same.

3. The COA type liquid crystal display panel according to claim 1, wherein the spacer layer comprises a primary spacer and a secondary spacer; the primary spacer and the secondary spacer are formed simultaneously with one of the other photoresists except the white photoresist, and the material of the primary spacer, the secondary spacer, and the one of the other photoresists except the white photoresist are the same; the height of the primary spacer is higher than the height of the secondary spacer.

4. A method for manufacturing a COA type liquid crystal display panel, comprising: forming a photoresist layer composed of a white photoresist, a red photoresist, a green photoresist, and a blue photoresist on a TFT layer, and form a spacer layer at the same time when using at least one color of the photoresists to make a corresponding photoresist; coating a white photoresist material on the TFT layer and photoetching the white photoresist material to form a white photoresist in a frame-shape having a plurality of hollow receiving portions.

5. The method for manufacturing a COA type liquid crystal display panel according to claim 4, comprising the following steps:
   Step 1: providing a first substrate and forming a TFT layer on the first substrate;
   Step 2: forming a red photoresist, a green photoresist, and a blue photoresist in an island shape in the receiving portions on the white photoresist through coating and photoetching; forming a primary spacer on the white photoresist at the same time when forming the blue photoresist through a mask, wherein the material of the primary spacer is the same as that of the blue photoresist; forming a secondary spacer on the white photoresist at the same time when forming the red photoresist or the green photoresist through a mask, wherein the material of the secondary spacer is the same as that of the red photoresist or the green photoresist;
   wherein the thickness of the blue photoresist is greater than the thickness of the red and the green photoresist; the thickness of the red and the green photoresist is the same; wherein the white photoresist, the red photoresist, the green photoresist, and the blue photoresist are arranged in an array to form a photoresist layer; wherein the primary spacer and the secondary spacer form a spacer layer;
   Step 3: covering an inorganic material or organic transparent material on the photoresist layer and the spacer layer to form a protection layer, and forming a through hole penetrating the protection layer and the photoresist layer by dry etching or wet etching;
   Step 4: evaporating ITO film on the protection layer and forming a pixel electrode layer through wet etching, wherein the pixel electrode layer is electrically connected to the TFT layer through the through hole; and
   Step 5: providing a second substrate, injecting liquid crystal molecules between the first substrate and the second substrate, and packaging the first substrate and the second substrate.

6. The method for manufacturing a COA type liquid crystal display panel according to claim 4, comprising the following steps:
   Step 1: providing a first substrate and forming a TFT layer on the first substrate;
   Step 2: forming a red photoresist, a green photoresist, and a blue photoresist in an island shape in the receiving portions on the white photoresist through coating and photoetching; forming a primary spacer and a secondary spacer on the white photoresist at the same time when forming the red photoresist, the green photoresist, or the blue photoresist through a gray tone mask; the material of the primary spacer and the secondary spacer is correspondingly the same as that of the red photoresist, the green photoresist, or the blue photoresist; wherein the height of the primary spacer is greater than the height of the secondary spacer;
   wherein the white photoresist, the red photoresist, the green photoresist, and the blue photoresist are arranged in an array to form a photoresist layer; wherein the primary spacer and the secondary spacer form a spacer layer;
   Step 3: covering an inorganic material or organic transparent material on the photoresist layer and the spacer layer to form a protection layer, and forming a through hole penetrating the protection layer and the photoresist layer by dry etching or wet etching;
   Step 4: evaporating ITO film on the protection layer and forming a pixel electrode layer through wet etching, wherein the pixel electrode layer is electrically connected to the TFT layer through the through hole; and
   Step 5: providing a second substrate, injecting liquid crystal molecules between the first substrate and the second substrate, and packaging the first substrate and the second substrate.

* * * * *